Sept. 29, 1959     H. ROTH ET AL     2,906,962

SWEEP GENERATOR

Filed Feb. 27, 1957

INVENTORS
HAROLD ROTH
BY    SAMUEL SOLOW

Darby + Darby

ATTORNEYS

United States Patent Office 2,906,962
Patented Sept. 29, 1959

2,906,962
SWEEP GENERATOR

Harold Roth, New Milford, N.J., and Samuel Solow, Tucson, Ariz., assignors to Allen B. Du Mont Laboratories, Inc., Clifton, N.J., a corporation of Delaware Application February 27, 1957, Serial No. 642,778

9 Claims. (Cl. 331—143)

This invention relates to sweep generators, and more particularly to a linear sweep generating circuit which utilizes nonlinear dielectric capacitors.

Many electronic devices require a sweep signal voltage whose waveform resembles a sawtooth. The most important requirement is that the slanting portion should be straight, or in technical language "linear." Prior art circuits produced sawtooth waveforms by charging a capacitor. Since the well known negative exponential charging curve produced thereby was inherently nonlinear, innumerable linearizing circuits were designed to overcome this shortcoming; all of the circuits were complex and expensive, and most of them had their own inherent limitations.

It is therefore the principal object of our invention to provide an improved, linear sweep generating circuit.

It is another object of our invention to provide a simple sweep circuit which can be readily adjusted to be linear, exhibit a positive exponential curvature, or produce a negative exponential waveform.

The attainment of these objects and others will be realized from the following specification, taken in conjunction with the drawings, in which, Fig. 1 shows the capacitance voltage curve of a typical nonlinear dielectric capacitor;

Our invention contemplates the use of a nonlinear dielectric capacitor for the production of a sawtooth waveform which may be used in sweep circuits; said waveform being linear or showing an exponential waveform having either positive or negative curvature characteristics, depending upon various parameters which will be hereinafter discussed.

It is well known that when the usual capacitance is charged by a source of potential, the output voltage waveform produced by the capacitance is a negative exponential waveform. The exponential waveform which is thus produced is a result characteristic of the usual capacitor having a substantially constant capacitance, regardless of the voltage applied across it. Since only a small portion of this exponential curve approximates linearity, the useful range is limited, and can be extended only by circuitry which effectively "straightens out" the nonlinear portion.

Capacitors containing a nonlinear dielectric have the unusual characteristic that their capacitance changes as different values of voltage are applied across them. We utilize this characteristic in the circuit shown in Fig. 2.

Figure 1:
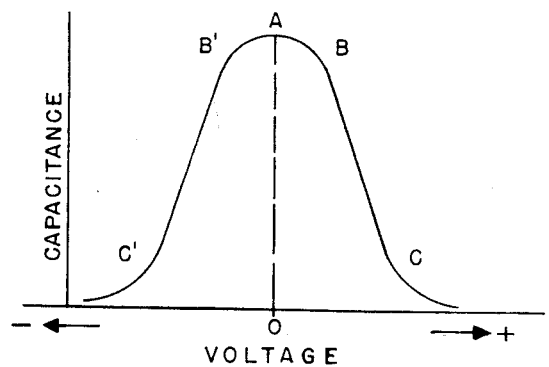

Referring to Fig. 1, however, there is illustrated the capacitance voltage curve of a nonlinear dielectric capacitor. If this capacitor is unbiased so that its operating point is A, any change of voltage—either positive or negative—will decrease the value of capacitance. There is a portion of the curve between points B and C where the curve is straight, i.e. linear. If the capacitor is biased so that its quiescent point is at B, it will be seen from Fig. 1 that any increase in applied voltage would cause the capacitances to decrease linearly until point C is reached. It will be realized that there are corresponding points B' and C' on the other portion of this curve.

Figure 2:
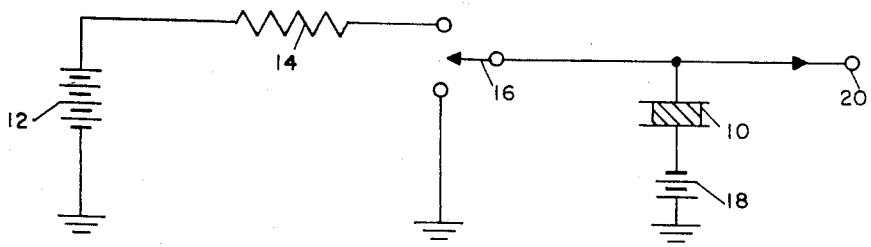
Fig. 2 illustrates the basic circuitry of our invention.

Referring now to Fig. 2 there is illustrated a capacitor 10 which contains a nonlinear dielectric material as indicated by the slash lines. This capacitor is charged by energy from a charging source 12, the current flowing through resistance 14 and switch 16. The output waveform appears at output terminal 20. This circuit of Fig. 2 operates as follows:

When switch 16 is open, capacitor 10 is at a quiescent point as illustrated by A of Fig. 1. When switch 16 is grounded, capacitor 10 has impressed across it a potential established by bias source 18, which establishes a quiescent point corresponding to B of Fig. 1. When switch 16 is opened this condition is maintained. If switch 16 is now closed to complete the circuit to charging source 12, the charging voltage is applied in such a direction that it will produce a change in capacitance which varies from B toward C as discussed in connection with Fig. 1. Since this B—C portion of the curve is linear, the output waveform at terminal 20 will be linear under conditions to be later discussed. Further, since the capacitance decreases between B and C, the progressively smaller capacitance charges up more quickly to provide the slanting portion of the waveform produced at terminal 20.

The value of resistance 14 acts to determine the rate of charge, or the slope—and not the shape of the output waveform; a smaller resistance giving a steeper slope.

If bias source 18 were of reversed polarity a quiescent point B' would be established, and reversing potential source 12 would cause capacitor 10 to vary from point B' toward C', to produce a negative going output waveform.

For a linear output signal, the parameters may be mathematically related by the equation $$E = \frac{C}{2S} - \frac{V}{2}$$

where

E is the voltage of charging source 12 in volts
C is the capacitance of capacitance 10 in micromicrofarads when switch 16 is in its grounded position
V is the voltage of bias source 18 in volts
S is the voltage sensitivity in micromicrofarads per volt $$\left(\frac{\mu\mu f.}{volt}\right)$$

The voltage sensitivity is usually stated by the manufacturer, and represents the slope of the linear portion B—C of the curve of Fig. 1. It may be obtained experimentally by changing the voltage by small amounts, and determining the variation in capacitance.

An output of negative exponential curvature is produced when E is less than this value established by the foregoing equation, and the output waveform exhibits a positive exponential curvature when E is greater than this value. In all cases the output waveform flattens out when the value of charging source 12 is reached.

Figure 3:
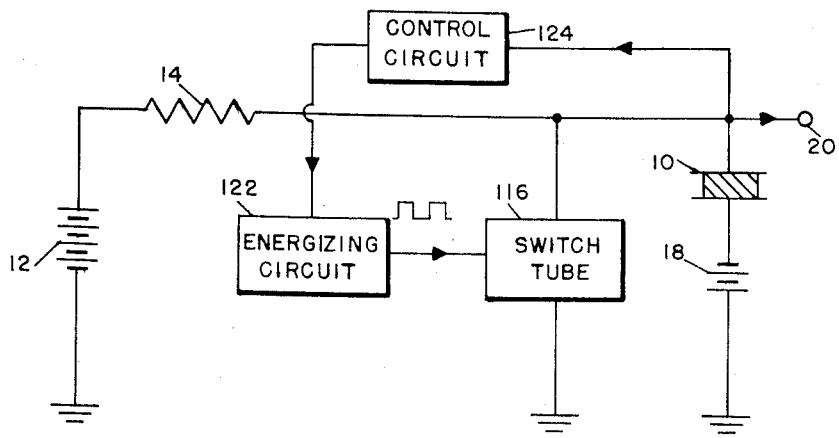
Fig. 3 depicts a linear sawtooth generating circuit utilizing our invention.

Fig. 3 illustrates a sweep generating circuit utilizing our invention. It will be seen that portions of Fig. 3 are substantially the same as Fig. 2, and that corresponding elements are identified by the same reference characters. Switch 16 of Fig. 2 is replaced in Fig. 3 by a switch tube 116 which operates in a manner well known in the art. When this tube is non-conductive it permits capacitor 10 to charge from source 12 as previously explained, and the output waveform is produced at output terminal 20. When switch tube 116 is conductive, it permits capacitor 10 to discharge and reestablish quiescent conditions, thus producing the retrace portion of a sawtooth waveform. The state of conduction of switch tube 116 is controlled by an energizing circuit 122 which may be a multivibrator. The output waveform of energizing circuit 122 has positive and negative portions which determine when the switch tube 116 is conductive or non-conductive. If desired, a control circuit 124 may select a level of the output waveform which controls the energizing circuit 122. In its simplest form, circuit 124 may be a diode which is ordinarily non-conductive, but at predetermined levels of the output waveform transmits a control signal to energizing circuit 122.

Having described the principles and two embodiments of our invention, we desire to be limited only by the appended claims.

What is claimed is:

1. The circuit comprising: a non-linear capacitance connected in a biasing circuit, said capacitance having a linear portion in its capacitance voltage curve; means to bias said capacitance to operate from one end of said linear portion, said means comprising a fixed bias voltage; means to interrupt said circuit, and to connect said capacitance into a charging loop; means charging said capacitance whereby the value of said capacitance varies along said linear portion to an operating point on the other end thereof; and means to derive an output waveform from said capacitance.

2. The circuit of claim 1 wherein $$E = \frac{C}{2S} - \frac{V}{2}$$

and where

E is the charging voltage in volts
C is the value of said capacitance in micromicrofarads when said bias voltage is applied thereto
V is the bias voltage in volts
S is the voltage sensitivity as furnished by the manufacturer in micromicrofarads per volt $$\left(\frac{\mu\mu f.}{volt}\right)$$

3. The circuit of claim 1 wherein E is greater than $$\frac{C}{2S} - \frac{V}{2}$$

and where

E is the charging voltage in volts
C is the value of said capacitance in micromicrofarads when it is exposed to said bias voltage
V is the bias voltage in volts
S is the voltage sensitivity as furnished by the manufacturer in micromicrofarads per volt $$\left(\frac{\mu\mu f.}{volt}\right)$$

4. A sweep generator comprising: a non-linear dielectric capacitance having a linear portion in its capacitance voltage curve; means biasing said capacitance to a value to one end of said linear portion, said means comprising means to apply a fixed bias to said capacitance; means to charge said capacitance, said means comprising a direct voltage, whereby the value of said capacitance varies to a value at the other end of said linear portion; means establishing the state of said capacitance, whether charging or discharging; and energizing means controlling said establishing means to thereby determine the frequency of said generator.

5. The circuit of claim 4 wherein $$E = \frac{C}{2S} - \frac{V}{2}$$

and where

E is the charging voltage
C is the value of said capacitance in micromicrofarads when it is in its biased state
V is the bias voltage in volts
S is the voltage sensitivity in micromicrofarads per volt $$\left(\frac{\mu\mu f.}{volt}\right)$$

6. The circuit of claim 4 wherein E is greater than $$\frac{C}{2S} - \frac{V}{2}$$

and where

E is the charging voltage in volts
C is the value of said capacitance in micromicrofarads when it is in its biased state
V is the bias voltage in volts
S is the voltage sensitivity in micromicrofarads per volt $$\left(\frac{\mu\mu f.}{volt}\right)$$

7. A sweep generating circuit comprising: a non-linear dielectric capacitance having a linear portion in its capacitance voltage characteristic curve, said capacitance having two terminals; means causing said capacitance to operate along said linear portion, said means comprising a fixed bias voltage connected to one terminal of said capacitance; means to charge said capacitance, said means comprising a source of direct potential and a resistance connected to said other terminal; means to establish the state of said capacitance, whether charging or discharging, said means comprising a switch tube; means comprising a multivibrator to control the frequency of said generator, said means controlling said state establishing means; and turn off means, energized by said capacitance, for applying a signal to said energizing means to cause retrace at a particular level of the output signal.

8. The circuit of claim 7 wherein $$E = \frac{C}{2S} - \frac{V}{2}$$

and where

E is the charging voltage in volts
C is the value of said capacitance in micromicrofarads when said bias voltage is applied thereto
V is the bias voltage in volts
S is the voltage sensitivity as furnished by the manufacturer in micromicrofarads per volt $$\left(\frac{\mu\mu f.}{volt}\right)$$

9. The circuit of claim 7 wherein E is greater than $$\frac{C}{2S} - \frac{V}{2}$$

and where

E is the charging voltage in volts
C is the value of said capacitance in micromicrofarads when it is exposed to said bias voltage
V is the bias voltage in volts
S is the voltage sensitivity as furnished by the manufacturer in micromicrofarads per volt $$\left(\frac{\mu\mu f.}{volt}\right)$$

References Cited in the file of this patent
UNITED STATES PATENTS

| | | |
|---|---|---|
| 2,555,959 | Curtis | June 5, 1951 |
| 2,591,792 | Donley | Apr. 8, 1952 |
| 2,677,799 | Foster et al. | May 4, 1954 |
| 2,787,727 | Maure et al. | Apr. 2, 1957 |

OTHER REFERENCES

"Effect of Field Strength on Dielectric Properties of Barium Strontium Titanate" by H. L. Donley in RCA Review, vol. VIII, No. 3, pages 539–553.